United States Patent [19]

Bauman et al.

[11] Patent Number: 4,971,817

[45] Date of Patent: Nov. 20, 1990

[54] PROCESS FOR PRODUCING A COMPOSITION FOR MICROWAVE COOKING

[75] Inventors: John A. Bauman, Chino Hills; Jones Y. C. Chan, Long Beach, both of Calif.

[73] Assignee: Beatrice/Hunt-Wesson, Inc., Fullerton, Calif.

[21] Appl. No.: 277,801

[22] Filed: Nov. 29, 1988

[51] Int. Cl.$^5$ .............................................. A23D 9/00
[52] U.S. Cl. .................................... 426/107; 426/234; 426/243; 426/601
[58] Field of Search ................. 426/107, 234, 243, 601

[56] References Cited

U.S. PATENT DOCUMENTS

| | | | |
|---|---|---|---|
| 3,851,574 | 12/1974 | Katz et al. | 426/107 |
| 4,156,021 | 5/1979 | Richardson | 426/604 |
| 4,283,427 | 9/1981 | Winters et al. | 426/234 |
| 4,518,618 | 5/1985 | Hsia et al. | 426/74 |

OTHER PUBLICATIONS

Bob Messenger, The microwave: Opening new doors to processors, *Prepared Foods* Oct. 1987.
Daniel Best, Microwave formulation: A new wave of thinking; *Prepared Foods* Oct., 1987.
Rick Lingle, Fine tuning microwaveable packaging; *Prepared Foods*, Oct., 1987.

*Primary Examiner*—Donald E. Czaja
*Assistant Examiner*—Helen Pratt
*Attorney, Agent, or Firm*—Pretty, Schroeder, Brueggemann & Clark

[57] ABSTRACT

A composition comprising glyceride oil, water hydrocolloid gum, and food grade salt which, when applied to a container with at least one susceptor and exposed to microwave energy, produces a sizzle sound. The composition is preferably prepared and applied in at least two layers.

5 Claims, No Drawings

PROCESS FOR PRODUCING A COMPOSITION FOR MICROWAVE COOKING

BACKGROUND OF THE INVENTION

This invention relates to compositions and a method of making compositions which, when applied to a container having at least one susceptor which container is suitable for cooking in a microwave oven, produce a sizzle sound when the container is exposed to microwave energy. The composition of the present invention retains its ability to produce the sizzle sound after storage for extended periods of time at temperatures less than about 4° C.

Deep fat frying, frying pan frying, and wok cooking are three traditional methods of food preparation which use oil to cook the food, and a sizzle sound accompanies such cooking. This sizzle sound has become associated with cooking by such methods, mainly because it is an inevitable result when water particles in the food are released and contact the hot oil or grease in the pan. To the practiced ear, the sizzle sound serves as an indication not only that the food is cooking, but also of the cooking temperature, and of the remaining cooking time.

However, the sizzle sound produced by these traditional methods of cooking is uncontrollable, and often spatters hot oil onto cooking surfaces and people nearby. Also, the quantities of oils used in these traditional cooking methods add a significant amount of calories to foods prepared by these methods. Despite such drawbacks, these cooking methods are still used due to the flavor and texture imparted to foods cooked in these manners.

With the recent popularity of time saving devices in general, and microwave ovens in particular, many products have been developed and marketed specifically for microwave oven preparation. The general object of these products is to make food cooked in a microwave oven resemble as closely as possible the same food cooked by conventional means except in the time necessary for preparation and for cleanup. Since their inception, microwave food products have improved significantly in the areas of taste and appearance. However, the familiar sounds associated with conventional cooking have been virtually eliminated, leaving the food preparation process with a somewhat high tech, plastic, or artificial quality.

Accordingly, it is an object of this invention to provide a composition for producing a sizzle sound when exposed to microwave energy to recreate more completely the sounds of conventional cooking methods.

SUMMARY OF THE INVENTION

In accordance with the present invention, a composition that produces a sizzle sound when exposed to microwave energy is prepared by mixing a glyceride oil, water, a hydrocolloid gum, and a food grade salt; and applying the composition to a container suitable for cooking in a microwave oven, said container having at least one susceptor. When the composition applied to the container is exposed to microwave energy, the composition produces a sizzle sound.

The composition comprises glyceride oil, water, hydrocolloid gum, and food grade salt, and is applied to the container either in a single layer or in multiple layers. If applied in multiple layers, the first layer preferably is a mixture comprising the glyceride oil and a first hydrocolloid gum although some of the salt and water can be included in the first layer. The second layer is a mixture comprising water, a second hydrocolloid gum, and the food grade salt. The second layer preferably additionally comprises a second glyceride oil.

Preferably, the amount of the composition applied to each container is small enough to produce a sizzle sound without the oil in the composition adding as many calories to the food being cooked as would be added by traditional cooking methods that utilize oil, and without causing any of the other undesirable side effects of the conventional cooking methods that utilize oil. Also, the amount of the composition is preferably large enough to continue the sizzle sound for a period of time after the container is removed from the microwave oven.

DETAILED DESCRIPTION OF THE INVENTION

The sizzle sound produced in conjunction with frying foods is largely a function of water particles coming in contact with a hot glyceride oil. In a microwave oven, foods traditionally prepared by frying can be made without the usual quantities of glyceride oil, and hence, although carefully formulated to look like and taste like their traditionally prepared counterparts, their preparation lacks the familiar sizzle sound.

Containers suitable for use in a microwave oven are preferably made of materials which are substantially transparent to microwave energy. Examples of commonly used materials include glass, plastics, and paper. The container should be shaped so that it is capable of containing foods or food preparations with high liquid content such as sauces, gravies, or water. As used herein, container means a container suitable for use in a microwave oven.

Susceptors comprise materials capable of converting microwave energy to thermal energy such as aluminum, stainless steel, tin, or other metals. Preferably, the susceptor also includes a material substantially transparent to microwave energy which is placed between the metal layer and the food in the container to prevent the metal from contacting and polluting the food. Typically, the susceptor is incorporated into the bottom of a container, either after the container is formed or during the formation process, or is placed on the bottom of the container. The food to be cooked is then placed on the susceptor, or on the portion of the container with the susceptor underneath it.

In the composition of the present invention a glyceride oil, water, a hydrocolloid gum, and a food grade salt, are combined, and the composition is applied to a container having at least one susceptor. The composition is preferably applied onto the susceptor which is at the bottom of the container and the food to be cooked is then placed on the composition. Upon exposure to microwave energy, the composition in the container will produce a sizzle sound.

The sizzle sound is produced by water particles coming in contact with, and escaping from, hot glyceride oil. A glyceride oil, or combination of glyceride oils, is a major component of the composition of the present invention. Glyceride oils may be solid or liquid at room temperature. Preferred glyceride oils have melting points below 100° C. and smoke points above 100° C. It is desirable for the glyceride oil to be a liquid at 100° C. so that water dispersed in the oil can easily escape on vaporization with the requisite sizzle sound.

Glyceride oils useful in the present invention may be derived from hydrogenated or unhydrogenated vegetable oils such as soybean, corn, safflower, sunflower, peanut, canola, coconut, or any mixtures or combinations of these oils. The glyceride oil generally comprises from about 50% to about 95% by weight of the overall composition and is most preferably between about 65% and about 80%.

The duration of the sizzle sound produced by the composition depends on the amount of water in the composition and the period of time over which water continues to vaporize as it contacts the hot glyceride oil. However, if the amount of water is too high, the sizzle sound is decreased because the water effectually drowns out the sizzle sound. Water generally comprises from about 5% to about 40% by weight of the composition, and most preferably between about 15% and about 35% by weight of the composition. These percentages do not include any water released from the food being cooked which will also contribute to the overall sizzle sound when it contacts the hot glyceride oil in the composition.

Once the composition reaches 100° C., the dispersed water particles begin to vaporize, thereby initiating the sizzle sound. In a composition of water and oil alone, the resulting sizzle sound would last only for a relatively short time period. Thus, in order to produce a sustained sizzle, a means of dispersing the water throughout the glyceride oil and slowly releasing the water is necessary. Therefore, to improve the water dispersion in the oil and to increase the period of time over which the water is released to produce a sizzle sound, a hydrocolloid gum is used. Hydrocolloid gums are edible polymeric materials which are soluble or dispersible in water.

The hydrocolloid gum hydrates in the water. This slows down the water vaporization process, and prolongs the duration of the sizzle sound. The hydrocolloid gum also disperses the water throughout the composition which aids in maintaining the stability of the composition for longer periods of time than would be the case without the gum. The amount of hydrocolloid gum used in the composition is less than about 3% by weight and is most preferably between about 0.1% and 1% by weight. If more than about 3% by weight of the hydrocolloid gum is used, the viscosity of the composition is increased to the extent that the composition becomes impractical to apply to the container.

Hydrocolloid gums useful in the present invention may be derived from a large variety of natural products such as gelatin, plant exudates, seaweeds, plant seeds, fruits, animal hides or bones, fermentation products, milk by-products, cellulose; from chemically modified celluloses; from a few totally or partially man-made products which could be classified as synthetic hydrocolloid gums, e.g. polyvinyl pyrrolidone, carbopols, ethylene oxide polymers, Gantrez AN, or from any mixtures or combinations of these gums. These hydrocolloid gums are well known to those skilled in the art. Some examples of natural hydrocolloid gums in the above categories are arabic gum, ghatti gum, karaya gum, tragacanth gum, agar, alginates, carrageenans, furcellarines, arabino galactanes, guar gum, locust bean gum, psyllium seed gum, tamarind seed gum, and xanthan gum. Some examples of chemically modified celluloses are microcrystalline cellulose, carboxymethylcellulose, methylethylcellulose, methylcellulose, and hydroxypropylcellulose. Xanthan gum, derived from microbial fermentation, is particularly preferred as it does not impart a bitter or fishy flavor to the food products cooked with the composition in the container. Xanthan gum is also preferred because the product is of a more consistent nature over time.

The sizzle sound begins when water contacts the hot glyceride oil and begins vaporizing, which is shortly after the composition reaches 100° C. To decrease the time necessary for the composition to reach 100° C., food grade salts with an affinity for microwave energy are used. These salts comprise from about 0.1% to about 10% by weight of the composition. At concentrations of salt above 10% by weight, the benefits of increased energy attraction are offset by the increased salty or bitter flavor which the salt in the composition imparts to the food. Therefore, most preferably the salt comprises less than about 5% by weight of the composition of the present invention. By varying the amount of the salt in the composition, the period of time during which the composition must be exposed to microwave energy before it reaches 100° C. and begins to produce a sizzle sound can be regulated as desired for the particular application. Examples of food grade salts useful in the present invention are edible, ionizing salts such as sodium chloride, potassium chloride, or sodium bicarbonate.

Preferably, the composition is prepared by first forming a preblend by mixing the hydrocolloid gum with the food grade salt. Then, while agitating the water, the preblend is slowly added to the water. Next, while maintaining agitation of the water/gum/salt system, the glyceride oil is slowly added and the composition is mixed until uniform. Finally, although not necessary from a functional viewpoint, the composition is preferably passed through a screen with openings of less than about 3.0 millimeters in diameter, e.g. a number 8 USS screen with openings of about 2.36 mm, in order to remove any large clumps of gum that may have formed. This last step is mainly to improve the appearance of the composition when applied to the container.

An alternate method of preparation which eliminates the need for screening the composition is to prepare a preblend of the salt and the hydrocolloid gum, and then add the preblend to the glyceride oil. Next, while agitating the water, the oil/salt/gum system is slowly added to the water and the composition is then mixed until uniform.

The composition is applied to a container with at least one susceptor. In a more preferred embodiment, the composition is applied in two layers, with the first layer comprising glyceride oil and a first hydrocolloid gum wherein the hydrocolloid gum comprises from about 0.001% to about 3% by weight of the first layer. While agitating the oil/gum mixture, the mixture is applied to a container having at least one susceptor. Then, the second layer comprising water, the food grade salt, and a second hydrocolloid gum is applied to the container and preferably is either sprayed or applied in drops to the first layer in the container.

In a more preferred embodiment, the second layer additionally comprises a second glyceride oil. The ratio of the first layer to the second layer varies depending on the type of food to be cooked in the composition.

The examples that follow provide a more detailed description of the present invention. These examples are, however, merely illustrative and are not intended as a limitation of the scope of the invention.

EXAMPLE 1

Xanthan gum was added to soybean oil and mixed together. Salt was dissolved in water, and the oil mixture and water mixture were then added to a blender and agitated until a homogeneous composition was formed. The overall proportions by weight were:

| | |
|---|---|
| Soybean Oil | 88.6% |
| Xanthan gum | 0.4% |
| Water | 10.0% |
| Sodium Chloride | 1.0% |

6.5 grams of this composition was then applied to a container with a susceptor. Upon exposure to microwave energy the composition produced a sizzle sound, both when heated alone, and when food was placed in the container with the composition.

EXAMPLE 2

A first layer was prepared of xanthan gum mixed with soybean oil. A second layer was prepared by forming a preblend of sodium chloride and xanthan gum, and then slowly adding the preblend into water while agitating the water. The overall proportions by weight were:

| | | |
|---|---|---|
| First Layer: | Soybean Oil | 99.7% |
| | Xanthan Gum | 0.3% |
| Second Layer: | Water | 90.09% |
| | Sodium Chloride | 9.01% |
| | Xanthan Gum | 0.90% |

The first layer was then applied to a container with a susceptor. The second layer was then sprayed onto the first layer in the container. The ratio of the first layer to the second layer was about 5.5:1 when chicken and vegetables were cooked in the container, and about 1.8:1 when beef or seafood and vegetables were to be cooked in the container. Upon exposure to microwave energy the composition produced a sizzle sound, both when heated alone, and when food was placed on the composition in the container.

EXAMPLE 3

A first layer was prepared of xanthan gum mixed with soybean oil and coconut oil. A second layer was prepared by forming a preblend of sodium chloride and xanthan gum, and then slowly adding the preblend into water while agitating the water. The overall proportions by weight were:

| | |
|---|---|
| First Layer: | |
| Soybean Oil | 59.82% |
| Coconut Oil | 39.88% |
| Xanthan Gum | 0.3% |
| Second Layer: | |
| Water | 90.09% |
| Sodium Chloride | 9.01% |
| Xanthan Gum | 0.90% |

The composition was applied to a container with a susceptor. The ratio of the first layer to the second layer was about 5.5:1. Upon exposure to microwave energy the composition produced a sizzle sound.

EXAMPLE 4

A first layer was prepared of xanthan gum mixed with soybean oil. The overall proportions by weight were:

| | |
|---|---|
| Soybean oil | 99.5% |
| Xanthan Gum | 0.5% |

A second layer was prepared by forming a preblend of sodium chloride and xanthan gum, then while agitating the water slowly adding the preblend. While continuing to agitate the water solution slowly adding the soybean oil and mixing until blended. The overall proportions by weight were:

| | |
|---|---|
| Sodium chloride | 6.9% |
| Xanthan gum | 0.8% |
| Water | 69.3% |
| Soybean oil | 23.0% |

The second layer was then run through a number 8 USS screen.

The first layer was then applied to a container with a susceptor. The second layer was then sprayed onto the first layer in the container. The ratio of the first layer to the second layer was about 2:1 when chicken and vegetables were cooked in the container, and about 1.5:1 when beef or seafood and vegetables were to be cooked in the container. Upon exposure to microwave energy the composition produced a sizzle sound, both when heated alone, and when food was placed on the composition in the container.

EXAMPLE 5

The following compositions were prepared in accordance with the method described in Example 4. In each composition the overall proportions by weight were as follows:

| | |
|---|---|
| First Layer | |
| First Glyceride Oil | 99.5% |
| First Hydrocolloid Gum | 0.5% |
| Second Layer | |
| Second Glyceride Oil | 23.00% |
| Second Hydrocolloid Gum | 0.77% |
| Water | 69.31% |
| Sodium Chloride | 6.92%. |

The ratio of the first layer to the second layer was about 2:1.

The glyceride oils and hydrocolloid gums used in each composition are set out in the following table.

| Composition | First and Second Glyceride Oil | First and Second Hydrocolloid Gum |
|---|---|---|
| A | Peanut oil | Xanthan Gum |
| B | Corn Oil | Xanthan Gum |
| C | Sunflower Oil | Xanthan Gum |
| D | Soybean Oil | Guar Gum |
| E | Soybean Oil | Tragacanth Gum |
| F | Soybean Oil | Methylcellulose Gum |
| G | Corn Oil | Guar Gum |
| H | Peanut Oil | Tragacanth Gum |
| I | Sunflower Oil | Methylcellulose Gum |

When applied to a container with a susceptor and the ratio of the first layer to the second layer being about 2:1 and exposed to microwave energy each composition produced a sizzle sound.

EXAMPLE 6

The following sets of compositions were prepared in accordance with the method of Example 4. In Set I, the first layer was held constant while varying the ratios of the ingredients in the second layer. In Set II, the second layer was held constant while varying the amounts of the ingredients in the first layer. In Set III, the ratios of the ingredients in each layer was held constant, and the ratio of the first layer to the second layer was varied. In each composition the first and second glyceride oils were soybean oil, the first and second hydrocolloid gums were xanthan gum, and the salt was sodium chloride. The overall proportions by weight were as follows:

| Set I. | | | | | | |
|---|---|---|---|---|---|---|
| First Layer | | | | | | |
| First Oil | 99.5% | | | | | |
| First Gum | 0.5% | | | | | |
| Second Layer | | | | | | |
| Composition | J | K | L | M | N | O |
| Oil | 62.3% | 17.3% | 23.0% | 23.0% | 23.0% | 23.0% |
| Water | 30.0% | 75.0% | 71.2% | 68.2% | 69.6% | 69.1% |
| Gum | 0.8% | 0.8% | 0.8% | 0.8% | 0.5% | 1.0% |
| Salt | 6.9% | 6.9% | 5.0% | 8.0% | 6.9% | 6.9% |

The ratio of layer 1 to layer 2 in each composition was 2.25:1.

| Set II | | |
|---|---|---|
| First Layer | | |
| Composition | P | Q |
| First Oil | 97.5% | 99.9% |
| First Gum | 2.5% | 0.1% |
| Second Layer | | |
| Second Oil | 23.0% | |
| Water | 69.3% | |
| Second Gum | 0.8% | |
| Salt | 6.9% | |

The ratio of layer 1 to layer 2 in each composition was 2.25:1.

| Set III | |
|---|---|
| First Layer | |
| Oil | 99.5% |
| Gum | 0.5% |
| Second Layer | |
| Oil | 23.0% |
| Water | 69.3% |
| Gum | 0.8% |
| Salt | 6.9% |

The ratio of layer 1 to layer 2 in composition R was 4:1 and in composition S was 1:1.

EXAMPLE 7

A first layer was prepared of xanthan gum mixed with soybean oil and coconut oil. A second layer was prepared by forming a preblend of sodium chloride and xanthan gum, while agitating water adding the preblend, while continuing to agitate the water adding a mixture of soybean oil, cocnut oil and xanthan gum. The overall proportions by weight were:

| First Layer: | |
|---|---|
| Soybean oil | 59.82% |
| Coconut oil | 39.88% |
| Xanthan gum | 0.30% |
| Second Layer: | |
| Water | 69.30% |
| Sodium chloride | 6.93% |
| Xanthan gum | 0.77% |
| Soybean oil | 13.80% |
| Coconut oil | 9.20% |

The composition was applied to a container with a susceptor with a ratio of the first layer to the second layer of about 2.25:1. Upon exposure to microwave energy the composition produced a sizzle sound.

While preferred embodiments and applications of this invention have been shown and described, it would be apparent to those skilled in the art that many more modifications are possible without departing from the inventive concept herein described. The invention, therefore, is to be limited only by the lawful scope of the claims which follow.

What is claimed is:

1. A process for preparing a composition that produces a sizzle sound when applied to a container having a susceptor and the container is exposed to microwave energy, comprising the steps of:
   combining a food grade salt with a hydrocolloid gum to form a first mixture;
   agitating water while slowly adding the first mixture to form a second mixture;
   agitating the second mixture while slowly adding a glyceride oil to form the composition; and
   applying the composition to the container having a susceptor.

2. A process as in claim 1 further comprising the step of:
   passing the composition through a mesh screen having openings of less than about 3.0 millimeters in diameter prior to applying the composition to the container.

3. A process as in claim 1 further comprising the steps of:
   mixing a second glyceride oil and a second hydrocolloid gum to form a first layer;
   applying the first layer to the container prior to applying the composition to the container, and
   applying the composition to the first layer.

4. A process for preparing a composition that produces a sizzle sound when applied to a container having a susceptor and the container is exposed to microwave energy, comprising the steps of:
   mixing a food grade salt with a hydrocolloid gum to form a first mixture;
   agitating a glyceride oil while slowly adding the first mixture to form a second mixture;
   agitating said second mixture while slowly adding water to form the composition; and
   applying the composition to the container having a susceptor.

5. A process as in claim 4 further comprising the steps of:
   mixing a second glyceride oil and a second hydrocolloid gum to form a first layer;
   applying the first layer to the container prior to applying the composition to the container; and
   applying the composition to the first layer.

* * * * *